United States Patent
Ito

(10) Patent No.: US 9,501,872 B2
(45) Date of Patent: Nov. 22, 2016

(54) AR IMAGE PROCESSING APPARATUS AND METHOD TECHNICAL FIELD

(71) Applicant: MICRONET CO., LTD., Sapporo-shi, Hokkaido (JP)

(72) Inventor: Kazuhiko Ito, Sapporo (JP)

(73) Assignee: MICRONET CO., LTD., Sapporo-shi (JP)

(*) Notice: Subject to any disclaimer, the term of this patent is extended or adjusted under 35 U.S.C. 154(b) by 0 days.

(21) Appl. No.: 14/379,881

(22) PCT Filed: Oct. 31, 2012

(86) PCT No.: PCT/JP2012/078177
§ 371 (c)(1),
(2) Date: Aug. 20, 2014

(87) PCT Pub. No.: WO2013/125099
PCT Pub. Date: Aug. 29, 2013

(65) Prior Publication Data
US 2015/0022552 A1     Jan. 22, 2015

(30) Foreign Application Priority Data
Feb. 22, 2012   (JP) .................................. 2012-036628

(51) Int. Cl.
*G06T 19/00*   (2011.01)
*G06K 9/00*    (2006.01)
(Continued)

(52) U.S. Cl.
CPC ......... *G06T 19/006* (2013.01); *G06K 9/00671* (2013.01); *G06T 11/00* (2013.01); *G06K 2009/3225* (2013.01)

(58) Field of Classification Search
CPC .................. G06T 19/006; G06T 19/00; G06K 9/00671
See application file for complete search history.

(56) References Cited

U.S. PATENT DOCUMENTS

| | | |
|---|---|---|
| 6,577,249 B1 | 6/2003 | Akatsuka et al. |
| 2008/0071559 A1 | 3/2008 | Arrasvuori |

(Continued)

FOREIGN PATENT DOCUMENTS

| | | |
|---|---|---|
| JP | 2001-126051 A | 5/2001 |
| JP | 2005-038153 A | 2/2005 |

(Continued)

OTHER PUBLICATIONS

Masayuki Kanbara et al.; "Registration for Stereo Vision-based Augmented Reality Based on Extendible Tracking of Markers and Natural Features"; Transactions of the Virtual Reality Society of Japan; vol. 7, No. 3, pp. 367-373 (Sep. 2002).

(Continued)

*Primary Examiner* — Michelle Chin
(74) *Attorney, Agent, or Firm* — Mots Law, PLLC

(57) ABSTRACT

A first AR analyzer (3A) analyzes a first captured image including an AR marker image captured by a camera (1), determines the appearance of the AR marker image in the field of view in the first captured image, and virtually places a corresponding CG at an appropriate position in the field of view corresponding to the AR marker image; a second AR analyzer (3B) calculates appearance of the CG object in another field of view of the camera in a second captured image subsequently captured by the camera; a CG rendering unit (5) composites an image of the CG object at an appropriate position in the second captured image corresponding to the appropriate appearance; and a display unit (7) displays the composite image, so that the apparatus can composite and display a CG object in real time on a digital image of a natural landscape captured by a camera.

2 Claims, 6 Drawing Sheets

(51) Int. Cl.
*G06T 11/00* (2006.01)
*G06K 9/32* (2006.01)

(56) References Cited

U.S. PATENT DOCUMENTS

2011/0300876 A1  12/2011  Lee et al.
2012/0249528 A1  10/2012  Park et al.

FOREIGN PATENT DOCUMENTS

| JP | 2011-141828 A | 7/2011 |
| JP | 2012-003598 A | 1/2012 |
| KR | 101056418 B1 | 8/2011 |
| TW | 201145226 A | 12/2011 |
| WO | 2004/038657 A2 | 5/2004 |

OTHER PUBLICATIONS

The New Zealand office action letter issued on Jul. 17, 2015 in the counterpart New Zealand patent application.
The Taiwan office action letter issued on Nov. 14, 2014, in the counterpart Taiwan patent application. (Application No. 101142214).
The Australian office action letter issued on Jun. 10, 2015 in the counterpart Australian patent application.
Jun Park et al, "Natural Feature Tracking for Extendible Robust Augmented Realities", First IEEE International Workshop on Augmented Reality (IWAR '98), Nov. 1, 1998, XP055209702, San Francisco, CA (USA), Retrieved on Aug. 26, 2015 from http://graphics.usc.edu/cgit/publications/papers/jun-IWAR98.pdf.
Genc Y et al., "Mark-less tracking for AR: a learning-based approach", Proceedings/ International Symposium on Mixed and Augmented Reality: ISMAR 2002; Sep. 30-Oct. 1, 2002, Darmstadt, Germany, IEEEE Computer Society, Los Alamitos, Calif. [U.A.], Sep. 30, 2002, pp. 295-304, XP010620976, ISBN: 978-0-7695-1781-0.
M.L. Yuan et al. "Registration using natural features for augmented reality systems", IEEE Transactions on Visualization and Computer Graphics, vol. 12, No. 4, Jul. 1, 2006, pp. 569-580, XP055209737, ISSN: 1077-2626, DOI: 10.1109/TVCG.2006.79.
Lepetit V et al., "Fully automated and stable registration for augmented reality applications", Proceedings/ The Second IEEE and ACM International Symposium on Mixed and Augmented Reality: Oct. 7-10, 2003, Tokyo, Japan, IEEE Computer Society, Los Alamitos, Calif, [U.A.], Oct. 7, 2003, pp. 93-102, XP010662800, DOI: 10.1109/ISMAR.2003.1240692, ISBN: 978-0-7695-2006-3.
The Extended European Search Report issued on Sep. 4, 2015 in the counterpart EP patent application.
The Japanese office action issued on Sep. 29, 2015 in the counterpart JP patent application.

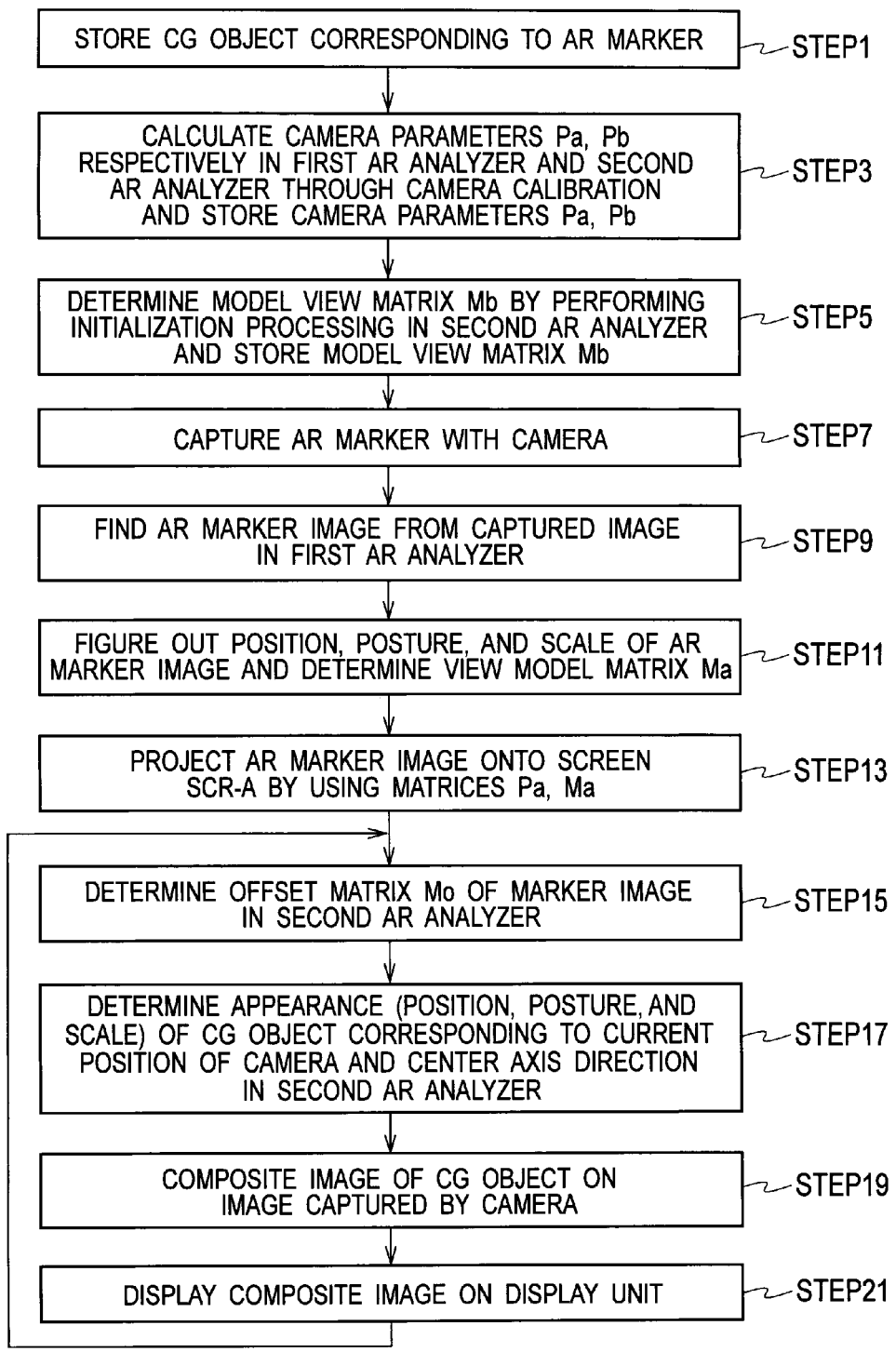

AR IMAGE PROCESSING APPARATUS AND METHOD TECHNICAL FIELD

TECHNICAL FIELD

The present invention relates to an AR image processing apparatus and method which employ a combination of an AR marker and a natural feature tracking method.

BACKGROUND ART

In many fields, there have been already used AR image processing apparatuses configured to composite a CG object on a target object image such as an AR marker image in real time by using augmented reality (AR) techniques, the target object image being captured by a camera which is an image capturing device such as a web camera or a digital video camera.

A marker based AR technique involves: registering in advance feature points forming a group having a certain shape in a digital image; detecting the registered feature points from a digital image captured by the image capturing device by using homography or the like; estimating the position, the posture, and the like of the group; and compositing and displaying a CG object at the position of an AR marker image corresponding to the position, the posture, and the like of the group.

In this AR technique, the feature points registered in advance and having the certain shape are referred to as AR marker (or simply "marker"). By adding additional information indicating the size and posture of the marker in the real world in the registration of the marker, the size of and the distance to the AR marker in a digital image obtained from the image capturing device can be accurately estimated to some extent. Meanwhile, when no recognizable feature points exist in the digital image, the position and posture of the marker cannot be estimated as a matter of course.

A natural feature tracking based AR technique as typified by PTAM ("Parallel Tracking and Mapping for Small ARWorkspaces", Oxford University) is an excellent method which requires no prior registration of the feature points in the digital image and which allows the image capturing device to be moved in any direction and to any position as long as the feature points can be tracked even when the position of the image capturing device is continuously moved.

However, since a base position needs to be designated first, the image capturing device needs to be moved in a special way to determine the base position from amounts of movement of the feature points in multiple images captured along with the movement of the camera, and position and posture information needs to be additionally provided. In this process, a base plane cannot be accurately determined unless the image capturing device is correctly moved. Moreover, in the natural feature tracking based AR technique, since no prior registration of feature points is generally performed due to the nature of the technique, information on the distance among and the size of feature points in a captured digital image cannot be accurately known. Hence, there is generally used a method of manually setting the size, direction and position of the CG object with respect to the base plane.

PRIOR ART DOCUMENTS

Patent Document

PATENT DOCUMENT 1: Japanese Patent Application Publication No. 2011-141828
PATENT DOCUMENT 2: Japanese Patent Application Publication No. 2012-003598

SUMMARY OF THE INVENTION

Problems to be Solved by the Invention

An object of the present invention is to provide an AR image processing method and apparatus which incorporate advantages of both of the conventional marker based AR technique and the conventional natural feature tracking based AR technique and which appropriately composite and display a CG object on a digital image of a natural landscape or the like captured by a camera.

To be more specific, an object of the present invention is to provide an AR image processing method and apparatus which can composite and display a CG object in real time on a digital image of a natural landscape or the like captured by a camera, at an accurate position, size, and posture without requiring a manual positioning operation and which can achieve realistic representation even when the camera is moved to various positions and in various directions.

Means for Solving the Problems

The present invention provides an AR image processing method comprising the steps: obtaining a scene in a fixed field of view which is captured by a camera and which includes an AR marker and its surroundings; causing a first AR analyzer to analyze a first captured image of the scene which is captured by the camera and which includes an AR marker image and its surroundings, determine a position, posture, and scale of the AR marker image in the field of view, and virtually place a corresponding CG object at an appropriate position in the field of view corresponding to the position, posture, and scale of the AR marker image; causing a second AR analyzer to calculate, for the CG object virtually placed at the appropriate position in the first field of view, appearance of the CG object in a second field of view of the camera in a second captured image subsequently captured in the second field of view by the camera; causing a CG rendering unit to composite an image of the CG object in the calculated appearance at an appropriate position in the second captured image of the camera; and causing a display unit to display the composite image.

Moreover, the present invention provides an AR image processing apparatus comprising: a camera; a first AR analyzer configured to analyze a first captured image of a scene in a field of view which is captured by the camera and which includes an AR marker and its surroundings, determine a position, posture, and scale of an AR marker image in the field of view, and virtually place a corresponding CG object at an appropriate position in the field of view corresponding to the position, posture, and scale of the AR marker image; a second AR analyzer configured to calculate, for the CG object virtually placed at the appropriate position in the first field of view, appearance of the CG object in a second field of view of the camera in a second captured image subsequently captured in the second field of view by the camera; a CG rendering unit configured to composite an image of the CG object in the calculated appearance, at an appropriate position in the second captured image of the camera which is obtained by the second AR analyzer; and a display unit configured to display an image composited by the CG rendering unit.

Effects of the Invention

The AR image processing technique of the present invention can composite and display a CG object in real time on a digital image of a natural landscape or the like captured by a camera, at an accurate position in an accurate size and posture, without requiring a manual positioning operation, and can achieve realistic representation even when the camera is moved to various positions and in various directions.

BRIEF DESCRIPTION OF THE DRAWINGS

FIG. 7 is a flowchart of an AR image processing method in the one embodiment of the present invention.

MODE FOR CARRYING OUT THE INVENTION

An embodiment of the present invention is described below in detail based on the drawings.

First, principles of the present invention are described. Generally, in order to analyze a digital image captured by a camera such as a web camera or a digital video camera with an AR analyzer and then composite and display a CG object on the digital image on the basis of position information on an image of a specific target object in the digital image, the CG object in a space needs to be subjected to projective transformation to the digital image. In the AR analyzer which performs such projective transformation, a 4×4 projection matrix P and a 4×4 model view matrix M need to be created. Projective transformation of a first AR analyzer A configured to detect the position of the target object image in the digital image captured by the camera is expressed as follows.

$$Ma'=Sa\cdot Pa\cdot Ma \quad \text{[Math 1]}$$

Meanwhile, projective transformation of a second AR analyzer B configured to detect the position of the target object image in the digital image by tracking natural features is expressed as follows.

$$Mb'=Sb\cdot Pb\cdot Mb \quad \text{[Math 2]}$$

Here, Sa and Sb are constants and are appropriate scaling parameters for the digital image onto which the CG object is projected. Projection matrices Pa and Pb are projection matrices determined by performing camera calibration in advance, as camera parameters of the camera used for image capturing. The matrices Pa, Pb may take values different from each other depending on the characteristics of the first AR analyzer A and the second AR analyzer B. This is one of the characteristics of the present invention.

Figure 1:
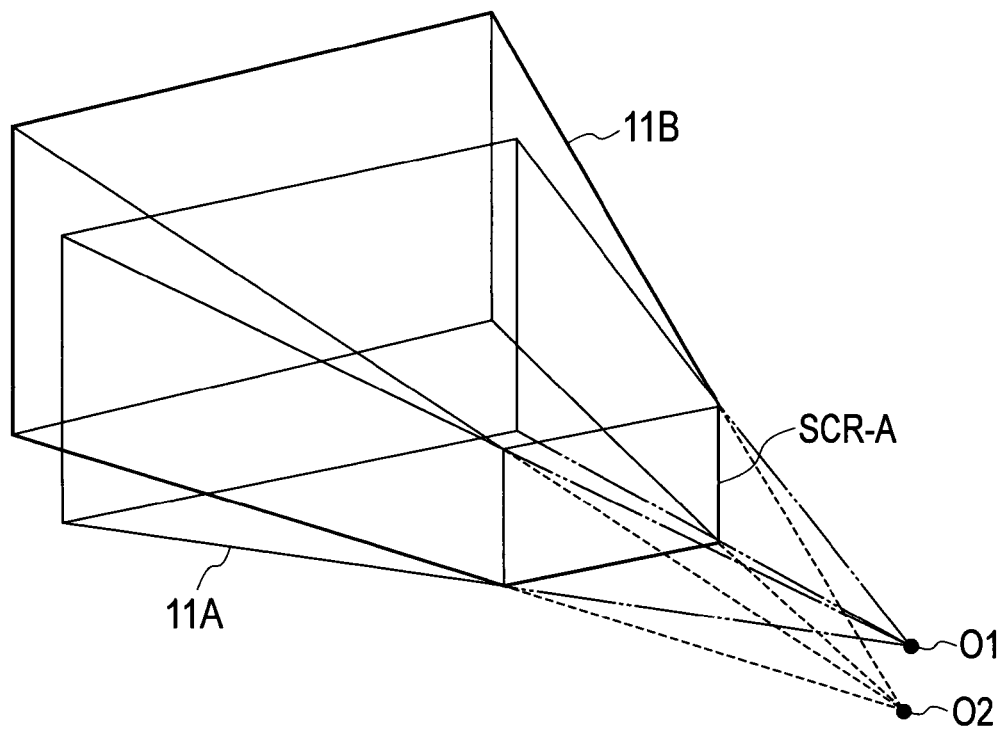
FIG. 1 is an explanatory view showing a view volume space of a first AR analyzer and a view volume space of a second AR analyzer in the present invention.

In view of view volumes 11A, 11B respectively of the AR analyzers A, B which are geometric schematic views of the projective transformation as shown in FIG. 1, it is possible to consider that these two different projective transformation matrices Pa, Pb share the same normalized screen plane SCR-A, i.e. projection plane when the same image capturing device (camera) is used.

Initialization processing of the second AR analyzer B is performed first in the present invention. Specifically, the second AR analyzer B which performs natural feature tracking assumes that the digital image captured by the camera is projected on the screen plane SCR-A, and determines an initial model view matrix Mb from the known projection matrix Pb. This operation uses, for example, a publicly-well-known method in which an image capturing position of the camera capturing the image is changed and the position of the camera is estimated from movement amounts of feature points by using epipolar geometry.

This initial model view matrix Mb determines the position and posture of the camera in a coordinate system of the second AR analyzer B, and the natural feature tracking based AR analyzer estimates the image capturing position of the camera, i.e. the model view matrix Mb from the thus-determined initial position, according to the movement amounts of the captured feature points.

The model view matrix Mb includes scaling elements. However, the distance among and the size of natural feature points observed in the digital image cannot be obtained from information on the natural feature points. Accordingly, in the conventional technique, a work of manual correction needs to be performed while the CG image is composited to represent given values on the digital image.

However, in the present invention, the following processing is performed as a subsequent step to solve this problem. In the aforementioned initialization step of the second AR analyzer B, the first AR analyzer A uses an AR marker whose scale, posture, and position are known in advance, to determine the view volume, i.e. the model view matrix Ma obtained by the projective transformation Pa, forming the normalized screen plane SCR-A of the digital image captured by the camera.

Figure 2:
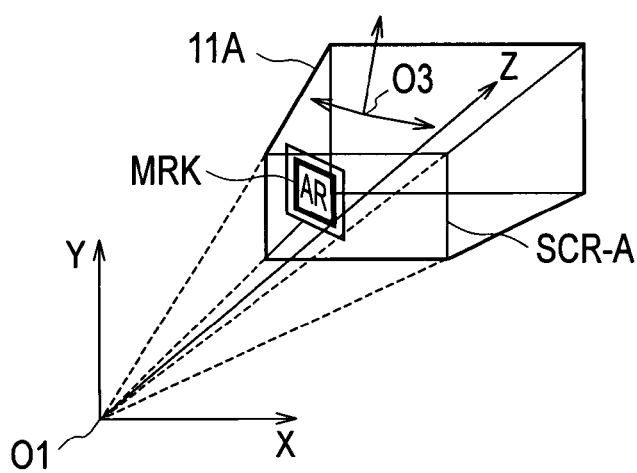
FIG. 2 is an explanatory view showing a relationship between the view volume space of the first AR analyzer in the present invention and coordinates with the position of a marker image detected in the view volume space as an origin.
Figure 3:
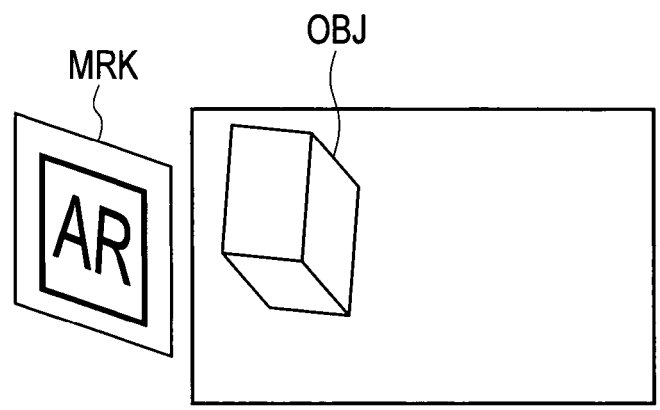
FIG. 3 is an explanatory view of the AR marker used in the present invention and a CG object image corresponding to the AR marker.
Figure 4:
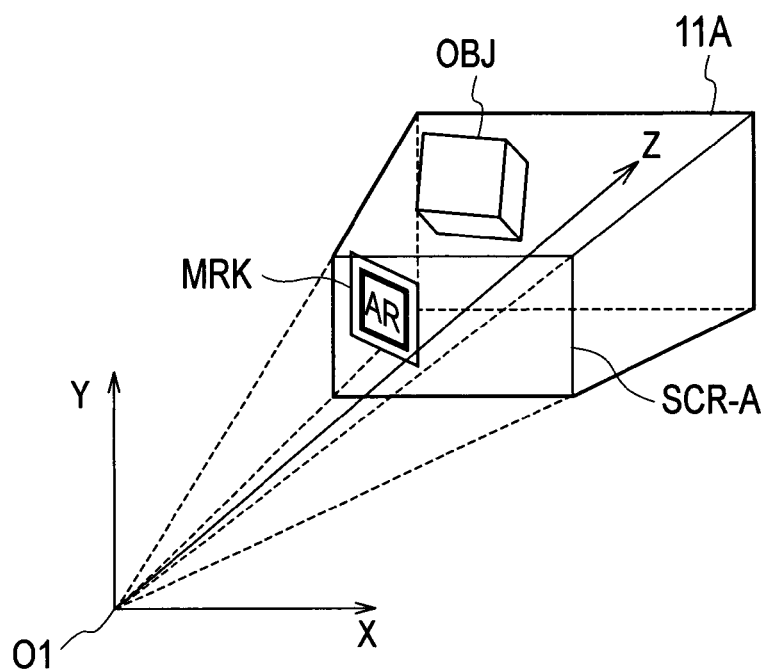
FIG. 4 is an explanatory view showing the marker image detected in the view volume space of the first AR analyzer in the present invention and the CG object corresponding to the marker image.

As shown in FIG. 2, this model view matrix Ma has information on a direction, a size, and marker position coordinates in a space corresponding to the position of a marker image MRK detected in the digital image captured in the projective transformation of the first AR analyzer A, and allows the image capturing position in the view volume space 11A of the first AR analyzer A to be determined relative to an origin O3, where the position of the marker image MRK in the view volume space is set as the origin O3.

In the present invention, the image capturing position is determined in terms of only appearance. It is only necessary that a positional relationship in the digital image is correctly represented and there is no need to represent a geometrically-precise position.

From the aforementioned processing, the position, posture, and scale of the marker image MRK projected on the screen plane SCR-A are estimated in the coordinate system of the first AR analyzer A and the initial model view matrix Mb in the coordinate system of the second AR analyzer B is obtained. However, generally, the coordinate system (origin O1) of the first AR analyzer A and the coordinate system (origin O2) of the second AR analyzer B are interpreted totally differently and, as shown in FIG. 1, the respective configurations of the view volumes 11A, 11B including optical center axes are also different from each other.

In the present invention, the normalized screen planes SCR-A of the view volumes 11A, 11B are considered to be at the same position and conversion between both coordinate systems are performed by using spatial position information on the screen planes SCR-A as a clue. Mappings projected on the screen planes SCR-A are thereby matched in terms of appearance. This means that the position, posture, and size of the actual marker image MRK which are estimated by the first AR analyzer A determine parameters of the appropriate position, posture, and scale for the position information on the natural feature points mapped on the screen plane SCR-A by the second AR analyzer B.

A translation component of the model view matrix Ma in the coordinate system of the first AR analyzer A is considered to represent the origin O3 in spatial coordinates of the AR marker image MRK while scaling and rotation components thereof are considered to represent the size and posture of the marker image MRK in the coordinate space of the first AR analyzer A.

The 4×4 projection matrix of the coordinate system of the first AR analyzer A is expressed as Pa while the 4×4 model view matrix is expressed as Ma, and Pa and Ma are assumed to be determined as follows.

$$Pa = \begin{bmatrix} a0 & 0 & a1 & 0 \\ 0 & b0 & b1 & 0 \\ 0 & 0 & c0 & c1 \\ 0 & 0 & -1 & 0 \end{bmatrix} \quad [\text{Math 3}]$$

$$Ma = \begin{bmatrix} e0 & e4 & e8 & e12 \\ e1 & e5 & e9 & e13 \\ e2 & e6 & e10 & e14 \\ e3 & e7 & e11 & e15 \end{bmatrix}$$

$a0 = 2n/(r-l)$ $b0 = 2n/(t-b)$ $a1 = (r+l)/(r-l)$ $b1 = (t+b)/(t-b)$ $c0 = -(f+n)/(f-n)$ $c1 = -2fn/(f-n)$

Figure 5:
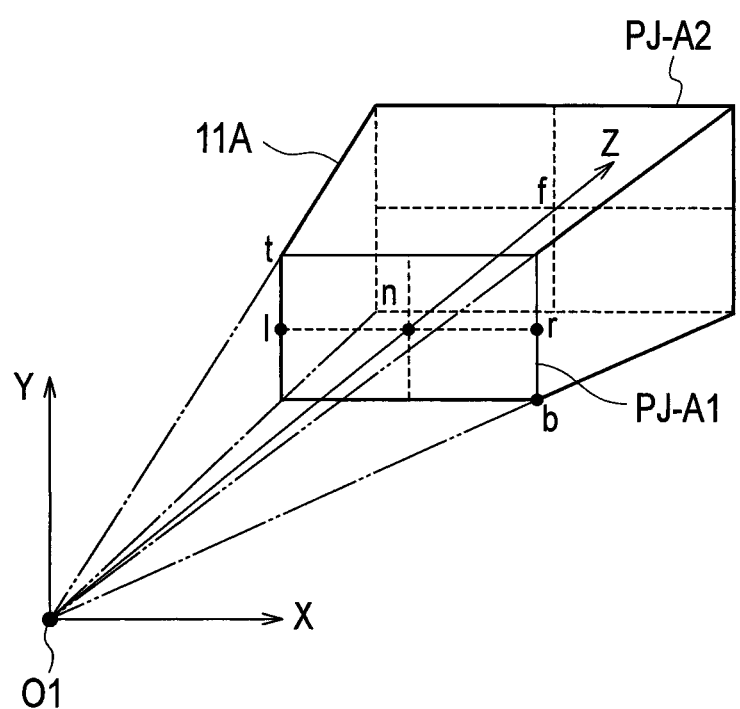
FIG. 5 is an explanatory view of definition of a view volume in a general pin-hole camera model.

As shown in FIG. 5, the coordinates of an upper left vertex of a projection plane PJ-A1 on a near side of the view volume frustum 11A from the origin O1 in the camera coordinate system (X, Y, Z) of the first AR analyzer A are (l, t, −n), the coordinates of a lower left vertex are (l, b, −n), the coordinates of an upper right vertex are (r, t, −n), coordinates of a lower right vertex are (r, b, −n), and the distance to a far-side plane PJ-A2 is expressed as f.

Consideration is given of a case where arbitrary spatial coordinates $M[X,Y,Z,1]^T$      [Math 4]

in the coordinate system of the first AR analyzer A are affine-converted to an AR marker observed position in the digital image which corresponds to the screen plane SCR-A. This is calculated as follows.

First, a translation vector Tr moving through $Ma \cdot M[X,Y,Z,1]^T$      [Math 5]

to the position of the screen plane SCR-A is expressed as follows by using the model view matrix Ma and n.

$Tr(-e12,-e13,-e14,+n)$      [Math 6]

A scaling parameter s in consideration of the projective transformation by the projection matrix Pa is expressed as follows.

$s = -(1/e14 \cdot Vb)/(t-b)$      [Math 7]

Here, Vb is a constant and is a height scale of the screen plane SCR-A.

A movement amount Tp at the position of the screen plane SCR-A in consideration of a deflection component of the optical center axis is expressed as follows.

$Tp(sx/sz \cdot Vb \cdot Ax, sy/sz \cdot Vb, 0)$      [Math 8]

where $sx = a0 \cdot e12 + a1 \cdot e14$ $sy = b0 \cdot e13 + b1 \cdot e14$ $sz = c0 \cdot e14 + e14$ Here, Ax is a constant expressing an aspect ratio of the screen plane SCR-A in a horizontal direction. Ax takes a value of 16/9 if the digital image is a 16:9 image, and takes a value of 4/3 if the digital image is a 4:3 image.

Mp represents a 4×4 matrix which is used to affine-convert the arbitrary spatial coordinates $M[X,Y,Z,1]^T$      [Math 9]

in the coordinate system of the first AR analyzer A to the AR marker observed position in the digital image which corresponds to the screen plane SCR-A, in homogeneous coordinate representation by using the parameters described above. By using [Tp] and [Tr] which are 4×4 matrix homogeneous coordinate representation of the translation vector, Mp is expressed as follows.

$Mp = [Tp] \cdot s \cdot [Tr] \cdot Ma$      [Math 10]

Accordingly, in the coordinate system of the first AR analyzer A, ma' expressing a mapping of $M[X,Y,Z,1]^T$      [Math 11]

to the screen plane SCR-A can be calculated as follows.

$ma' = Mq \cdot Mp \cdot M[X,Y,Z,1]^T$      [Math 12]

Focusing only on the origin O3 of the marker coordinates, ma' is calculated as follows.

$ma' = Mq \cdot Mp \cdot [0,0,0,1]^T$      [Math 13]

Here, it is considered that the mapping ma' to the screen plane SCR-A can be observed in the same fashion also in the coordinate system of the second AR analyzer B. In this case, like Pa, the projective transformation matrix Pb of the second AR analyzer B is defined as follows.

$$Pb = \begin{bmatrix} a0 & 0 & a1 & 0 \\ 0 & b0 & b1 & 0 \\ 0 & 0 & c0 & c1 \\ 0 & 0 & -1 & 0 \end{bmatrix} \quad [\text{Math 14}]$$

Moreover, as in the case of Pa, vertex parameters of the view volume 11B of the second AR analyzer B can be calculated as follows.

$r = n(a1+1)/a0$ $l = n(a1-1)/a0$ $t = n(b1+1)/b0$ $b = n(b1-1)/b0$      [Math 15]

In a case where the first AR analyzer A and the second AR analyzer B respectively use the digital images of the same aspect ratio, projection planes PJ-A, PJ-B respectively of the view volumes 11A, 11B also have the same aspect ratio. Accordingly, if S' represents a ratio of scaling interpretation between the first AR analyzer A and the second AR analyzer B, it is possible to consider as follows.

$$S'=Pb[n(b1+1)/b0]/Pa[n(b1+1)/b0] \quad \text{[Math 16]}$$

Note that Pb[n(b1+1)/b0] represents parameters of Pb in the coordinate system of the second AR analyzer B while Pa[n(b1+1)/b0] represents parameters of Pa in the coordinate system of the second AR analyzer B.

This is directly considered to be the difference in the scaling interpretation between the first AR analyzer A and the second AR analyzer B.

When the position of the marker image MRK estimated in the coordinate system of the first AR analyzer A is considered to represent the origin position O3 of the spatial coordinates in the coordinate system of the second AR analyzer B, the origin position $[0,0,0,1]^T$ of the coordinate system of the second AR analyzer B can be observed as ma' by the projective transformation of the second AR analyzer B. Accordingly, $$S'\cdot ma'=Mo\cdot Mb[0,0,0,1]^T \quad \text{[Math 17]}$$

is set. Here, Mo is a 4×4 constant matrix.

Since ma' is known in the formula described above, the constant matrix Mo can be determined from the following formula.

$$Mo=S'\cdot ma'/Mb\cdot[0,0,0,1]^T \quad \text{[Math 18]}$$

When the offset matrix Mo is applied to the projective transformation of the second AR analyzer B, the following formula can be determined.

$$Mb'=Sb\cdot Pb\cdot Mo\cdot Mb \quad \text{[Math 19]}$$

The constant matrix Mo determined as described above is an offset matrix which represents the posture and the size of the marker image MRK at an origin in the projective transformation Mb of the second AR analyzer B, where the position of the marker image MRK analyzed by the first AR analyzer A is set as the origin. In the second AR analyzer B which performs conventional natural feature tracking, a user manually determines this offset matrix while viewing a composite screen.

Figure 6:
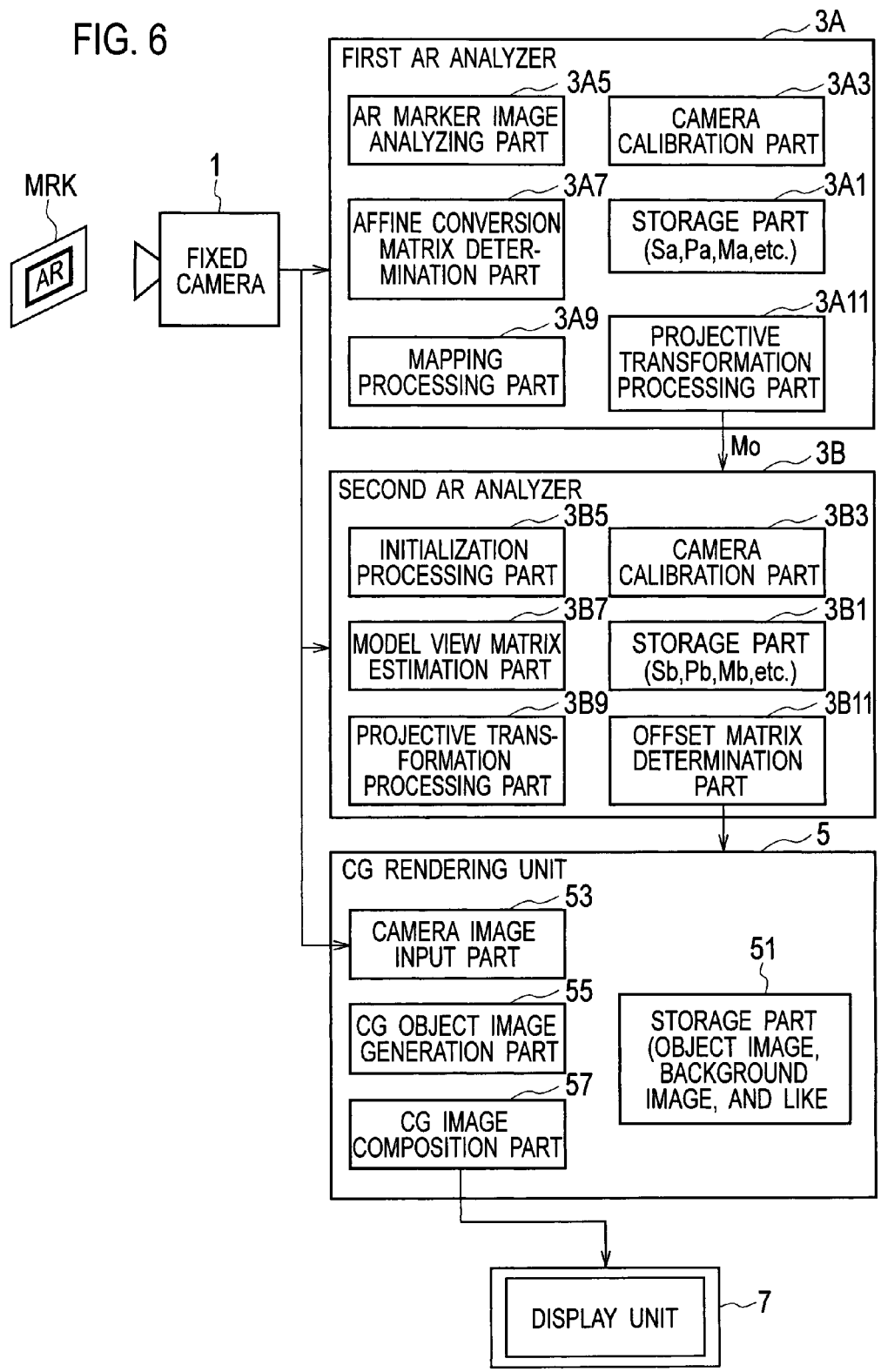
FIG. 6 is a block diagram of an AR image processing apparatus in one embodiment of the present invention.

Next, an AR image processing apparatus of one embodiment of the present invention and an AR image processing method performed by this apparatus are described by using FIGS. 6 and 7. FIG. 6 shows a configuration of the AR image processing apparatus of the embodiment. The AR image processing apparatus is mainly formed of a camera 1, an AR marker recognition based first AR analyzer 3A, a natural feature tracking based second AR analyzer 3B, a CG rendering unit 5, and a display unit 7.

The AR marker recognition based first AR analyzer 3A analyzes a captured image of a scene in a field of view which is captured by the camera 1 and which includes the AR marker image MRK, determines the position, posture, and scale of the AR marker image MRK in the field of view, reproduces a corresponding CG object OBJ at an appropriate position in the view volume 11A of the camera 1 corresponding to the position, posture, and scale of the AR marker image, and determines the coordinates of the AR marker image MRK. The first AR analyzer 3A includes a storage part 3A1 configured to store pieces of data required for this processing of the storage part 3A1, a camera calibration part 3A3, an AR marker image analyzing part 3A5, an affine conversion matrix determination part 3A7, a mapping processing part 3A9, and a projective transformation processing part 3A11. Spatial coordinate data of the AR marker image in the view volume space 11A of the first AR analyzer 3A which is figured out by the projective transformation processing part 3A11 is outputted to the second AR analyzer 3B.

The second AR analyzer 3B is a natural feature tracking based AR analyzer and includes a storage part 3B1 configured to store pieces of data, a camera calibration part 3B3, an initialization processing part 3B5 configured to perform initialization processing of the second AR analyzer 3B, a model view matrix estimation part 3B7, a projective transformation processing part 3B9, and an offset matrix determination part 3B11.

The CG rendering unit 5 includes a storage part 51 configured to store pieces of data, a camera image input part 53 configured take in the image captured by the camera 1, a CG object image generation part 55 configured to generate a CG object image by using the offset matrix Mo of the second AR analyzer 3B, and a CG image composition part 57. The CG image composition part 57 of the CG rendering unit 5 composites the camera captured image of the camera image input part 53 and the object image of the CG object image generation part 55 with each other and outputs a composite image to the display unit 7.

Figure 8A:
FIG. 8A is an AR composite image in the embodiment and is an AR composite image for an image captured at such an angle that a camera can capture the entire AR marker.
Figure 8B:
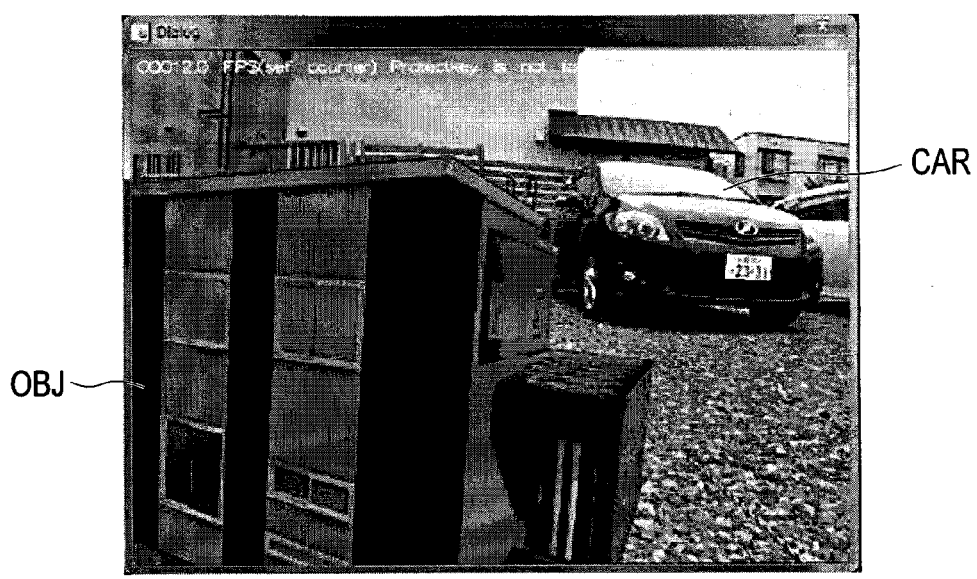
FIG. 8B is an AR composite image in the embodiment and is an AR composite image for an image captured at such an upward angle that the camera cannot capture the AR marker.

As shown in FIG. 8B, the display unit 7 displays an image in which the CG object OBJ is composited on the image captured in the current field of view of the camera 1 at a corresponding position in a corresponding posture.

Next, the AR image processing method performed by the aforementioned AR image processing apparatus is described by using FIG. 7. In summary, the AR image processing method of the embodiment is characterized in that the method includes: causing the camera 1 to capture a scene in the field of view which includes the AR marker MRK and its surroundings: causing the first AR analyzer 3A to analyze the captured image of the scene which is captured by the camera 1 and which includes the AR marker image MRK and its surroundings, determine the position, posture, and scale of the AR marker image MRK in the view volume 11A, virtually place the corresponding CG object OBJ at an appropriate position in the view volume space corresponding to the position, posture, and scale of the AR marker image ARK; causing the second AR analyzer 3B to calculate the appearance of the CG object OBJ in the field of view of the camera for the image currently being captured by the camera 1; compositing the CG object OBJ in appropriate appearance at an appropriate position in the image captured by the camera 1; and displaying the composite image on the display 7.

To be more specific, the following steps are performed.

STEP 1: The CG object corresponding to the AR marker is stored.

STEP 3: The camera parameters Pa, Pb are calculated through camera calibration respectively in the first AR analyzer 3A and the second AR analyzer 3B, and are stored respectively in the storage parts 3A1, 3B1.

STEP 5: In the second AR analyzer 3B, the initialization processing is performed to determine the model view matrix Mb and the model view matrix Mb stored.

The steps described above are included in preprocessing.

STEP 7: A scene including the AR marker MRK is captured by the camera 1 and the captured image is inputted to the first AR analyzer 3A.

STEPS 9, 11: In the first AR analyzer 3A, the AR marker image MRK is found from the captured image, the position, posture, and scale of the AR marker image MRK are figured out, and the view model matrix Ma is determined.

STEP 13: In the first AR analyzer 3A, the AR marker image MRK is projected onto the screen SCR-A by using the matrices Pa, Ma and a result of the projection is outputted to the second AR analyzer 3B.

STEP 15: In the second AR analyzer 3B, the offset matrix Mo of the marker image MRK is determined.

STEP 17: In the second AR analyzer, the appearance (position, posture, and scale) of the CG object corresponding to the current position of the camera and a center axis direction is determined, the CG object is projected onto the screen plane SCR-A, and a result of the projection is outputted to the CG rendering unit 5.

STEP 19: Image data of the CG object OBJ is read from the storage part 51, an image of the shape of the CG object as viewed at the current camera angle for the CG object is generated by using data of the projective transformation matrix from the second AR analyzer 3B, and this image is CG composited at a corresponding spatial coordinate position in the image currently captured by the camera 1.

STEP 21: The composite image is displayed on the display unit 7.

In the embodiment of the present invention, the marker recognition based first AR analyzer 3A can automatically determine the position, posture, size of the target marker image MRK, and the natural feature tracking based second AR analyzer 3B can continue position estimation even when the marker image MRK is out of the screen. Accordingly, as shown in FIG. 8, it is possible to composite and display, in real time, the CG object OBJ on a natural landscape in a digital image captured by the camera 1, at a correct position in a correct size and a correct posture without requiring a manual positioning operation, and to move the camera 1 to various positions and in various directions. In FIG. 8A, the CG object OBJ corresponding to the marker image MRK in which almost the entire AR marker is captured is composited and displayed for this marker image MRK. In an upper right portion of the screen, a small portion of a lower section of a front bumper of a car CAR is also captured. In this case, even when the camera is moved upward and set to a camera angle in which no AR marker is included in the screen, as shown in FIG. 8B, the CG object OBJ can be composited and displayed on the camera captured image at a position and in a posture as viewed from the moved camera. Specifically, the CG object OBJ shown in the image of FIG. 8A is displayed in a manner viewed in a line of sight from a higher position, in the CG composite image of FIG. 8B. Moreover, in FIG. 8B, it is also notable that almost the entire car CAR is captured in the image due to the upward movement of the camera 1.

EXPLANATION OF THE REFERENCE NUMERALS

MRK AR marker (image)
OBJ CG object
1 Fixed camera
3A First AR analyzer
3B Second AR analyzer
5 CG rendering unit
7 Display unit

The invention claimed is:

1. An augmented reality (AR) image processing method comprising:

storing in a storage an image data of a CG object corresponding to an AR marker;

causing a camera to capture from a first capturing position a first captured image of a first scene which includes the AR marker and surroundings of the AR marker;

causing an AR marker recognition based first AR analyzer to obtain the first captured image, carry out an AR marker recognition process to find out an AR marker image from the first captured image and determine a position, posture, and scale of the AR marker image in a first view volume space defined in a first coordinate system of the first AR analyzer corresponding to the first captured image;

causing the camera at a second position different from the first position to capture a second captured image of a second scene;

causing a natural feature tracking based second AR analyzer to obtain the first captured image and data of the determined position, posture, and scale of the AR marker image in the first view volume space corresponding to the first captured image;

causing the second AR analyzer to calculate a position, posture, and scale of the AR marker image in a second view volume space defined in a second coordinate system of the second AR analyzer corresponding to a current position, center axis direction and field of view of the camera, and carry out a natural feature tracking process between the first and the second captured images to determine a position, posture, and scale of the AR marker image in the second view volume space of the second AR analyzer, the second coordinate system being different from the first coordinate system;

causing a CG rendering unit to read out the image data of the CG object corresponding to the AR marker from the storage, reproduce an image of the CG object corresponding to the calculated position, posture, and scale in the second view volume space and composite the image of the CG object with the second captured image of the camera; and causing a display unit to display the composite image.

2. An AR image processing apparatus comprising:

a camera capturing a first captured image of a scene in a first field of view which includes an AR marker and its surroundings and a second captured image of a scene in a second field of view which includes at least some of the surroundings which included in the first captured image, the second field of view being different from the first field of view;

a storage storing an image data of a CG object;

an AR marker recognition based first AR analyzer obtaining the first captured image, carrying out an AR marker recognition process to find out an AR marker image from the first captured image and determine a position, posture, and scale of the AR marker image in a first view volume space defined in a first coordinate system of this first AR analyzer corresponding to the first captured image;

a natural feature tracking based second AR analyzer obtaining the first captured image and data of the determined position, posture, and scale of the AR marker in the first view volume space, calculating a position, posture, and scale of the AR marker in a second view volume space defined in a second coordinate system of the second AR analyzer corresponding to a current position, center axis direction and field of view of the camera, obtaining the second captured image, and carrying out a natural feature tracking process between the first and the second captured images to determine a position, posture, and scale of the AR marker image in the second view volume space of the second AR analyzer, the second coordinate system being different from the first coordinate system;
a CG rendering unit reading out the image data of the CG object corresponding to the AR marker from the storage, reproducing an image of the CG object corresponding to the calculated position, posture, and scale in the second view volume space, and compositing the image of the CG object with the second captured image of the camera; and
a display unit displaying the composite image.

\* \* \* \* \*